US007503737B2

(12) United States Patent
Sherman

(10) Patent No.: US 7,503,737 B2
(45) Date of Patent: Mar. 17, 2009

(54) CARGO BOX INNER FOR A VEHICLE

(75) Inventor: Andrew M. Sherman, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 471 days.

(21) Appl. No.: 11/308,460

(22) Filed: Mar. 28, 2006

(65) Prior Publication Data

US 2007/0231100 A1 Oct. 4, 2007

(51) Int. Cl.
*B60P 7/08* (2006.01)

(52) U.S. Cl. ........................... 410/115; 410/46; 410/97; 410/104; 410/106

(58) Field of Classification Search ................... 410/46, 410/97, 104, 105, 106, 110, 115, 116; 296/181.3, 296/183.1, 184.1, 37.6, 39.2; 224/403
See application file for complete search history.

(56) References Cited

U.S. PATENT DOCUMENTS 4,226,465 A 10/1980 McCullough
4,453,761 A 6/1984 Felburn
4,534,589 A 8/1985 Booher
4,850,769 A 7/1989 Matthews
5,533,848 A 7/1996 Davis
5,882,058 A 3/1999 Karrer
6,283,538 B1 9/2001 Reitnouer
6,530,730 B2 * 3/2003 Swensen ..................... 410/106
6,871,904 B2 3/2005 Bhat et al.

* cited by examiner

*Primary Examiner*—Stephen Gordon
(74) *Attorney, Agent, or Firm*—Dickinson Wright PLLC; Raymond Coppiellie

(57) ABSTRACT

A cargo box inner comprised of a center floor panel, a pair of outboard floor panels, a pair of sidewall panels, and an understructure framework, with one or more of these parts comprised of aluminum. The sidewall panels surround a cargo bed and extend from the outboard panels by a predetermined angle. The outboard panels extend from a pair of opposing side portions of the center floor panel. These side portions are offset from a longitudinal axis of the center floor panel. The center floor panel and the outboard floor panels are attached to the understructure framework, which includes a pair of longitudinal rails and a series of lateral rails. Each longitudinal rail defines a slot and a channel in open communication with the cargo bed for receiving a fastener and securing a cargo item to the vehicle.

16 Claims, 3 Drawing Sheets

CARGO BOX INNER FOR A VEHICLE

TECHNICAL FIELD

The present invention relates generally to vehicles, and more particularly to a cargo box inner that fastens cargo to a vehicle, increases storage capacity therein, and has low manufacturing costs.

BACKGROUND

Cargo box inners ("cargo boxes") typically define an open-topped bed for use in hauling cargo behind a passenger cabin of a truck. Accordingly, cargo boxes are also known as pickup boxes, truck boxes, pickup truck boxes, and truck bed boxes.

Traditional cargo boxes were comprised of up to forty (40) steel components, including panels with a thermoformed plastic liner. These steel components typically were welded together for defining a bed floor, two sidewalls, and a headboard.

Automotive manufacturers have developed a cargo box with a one-piece composite construction, which could be produced more quickly and at significantly lower costs than its steel counterpart. In addition, the composite box is substantially lightweight and has improved resistance to dents and corrosion.

Existing one-piece cargo boxes do not have mounting fixtures integrally formed therein. Also, the typical one-piece box includes a floor portion and two sidewall portions, which extend somewhat outboard from the floor portion. In this way, the cargo box can be removed from a mold after the box has been fabricated. Also, in this regard, the largest width of the cargo box typically is measured between the top ends of the opposing sidewall portions. In other words, the floor portion does not extend across as much of the available space between the outer sidewall fenders as the top ends of the sidewall portions. It is understood that a wider floor portion can increase the storage capacity of the vehicle.

It would therefore be desirable to provide a cargo box having a lightweight construction with enhanced storage capacity and low manufacturing costs.

SUMMARY OF THE INVENTION

A cargo box inner for a vehicle is provided. The cargo box inner is comprised of a center floor panel, a pair of outboard floor panels, a pair of sidewall panels, and an understructure framework, with one or more of these parts comprised of aluminum. The sidewall panels surround a cargo bed and extend from the outboard floor panels by a predetermined angle. The outboard panels extend from a pair of opposing side portions of the center floor panel. These side portions are offset from a longitudinal axis of the center floor panel. The center floor panel and the outboard floor panels are attached to the understructure framework, which includes a pair of longitudinal rails and a series of lateral rails. Each longitudinal rail defines a slot and a channel, which are in open communication with the cargo bed and receive a fastener for securing a cargo item to the vehicle.

One advantage of the invention is that a cargo box inner is provided that has a substantially light and robust construction for improving fuel economy and overall vehicle performance.

Another advantage of the invention is that a cargo box inner is provided that can easily secure a variety of cargo items to a vehicle.

Yet another advantage of the invention is that a cargo box inner is provided that has generally fewer components and is thus manufactured within shorter cycle times and at lower costs.

Still another advantage of the invention is that a cargo box inner is provided that has a modular construction with components that can be efficiently packaged for storing and/or inexpensively shipping in large volumes.

Yet another advantage of the invention is that a cargo box inner is provided that has a modular construction that can be quickly repaired with minimized costs associated therewith.

Still another advantage of the invention is that a cargo box inner is provided that has a robust construction for supporting high-load cargo.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention.

DETAILED DESCRIPTION OF THE INVENTION

Figure 1:
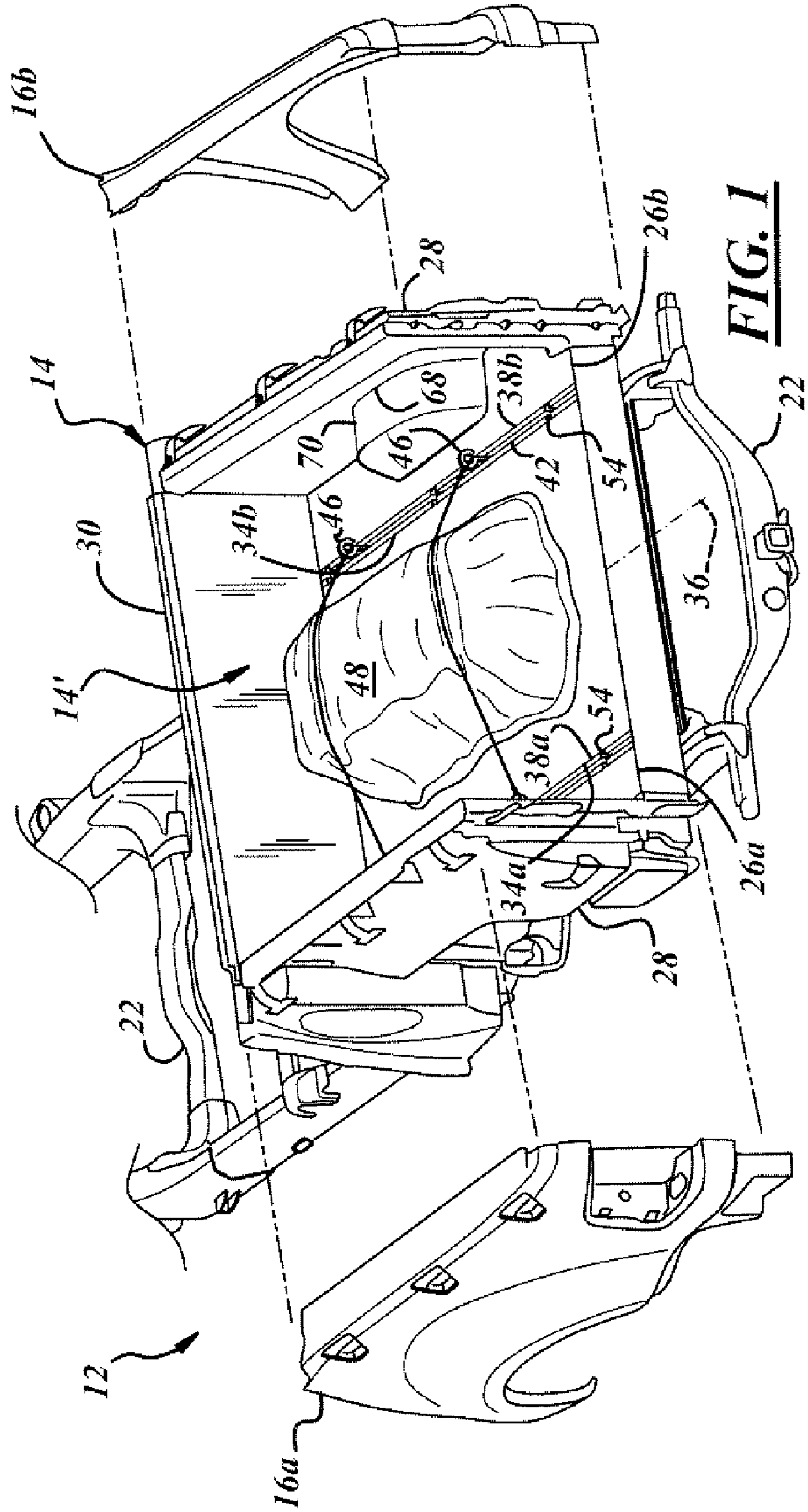
FIG. 1 is an exploded perspective view of a rear-end vehicle body structure having a cargo box inner, according to one advantageous embodiment of the claimed invention.

In the following figures, the same reference numerals are used to identify the same components in the various views.

The present invention is particularly suited for a cargo box inner ("cargo box") for an open-topped bed of a vehicle, such as a sports utility vehicle ("SUV"). Accordingly, the embodiments described herein employ structural features where the context permits.

However, various other embodiments are contemplated having different combinations of the described features, having additional features other than those described herein, or even lacking one or more of those features. For instance, the cargo box can be integrated within a pickup truck having an open-topped bed, a luxury SUV having an enclosed rear cargo bay, an SUV having a retractable roof over its cargo bay, or other suitable vehicles. Thus, the claimed invention can be carried out in a variety of other modes and utilized for other suitable applications as desired.

Referring now to FIG. 1, there is shown an exploded perspective view of a rear-end vehicle body structure 12 ("body structure") having a cargo box 14, according to one advantageous embodiment of the claimed invention. As detailed below, the cargo box 14 has a substantially light construction for enhancing the overall performance of the vehicle. In addition, the cargo box 14 has substantially few components for decreasing the manufacturing cycle time and also minimizing the manufacturing costs.

The body structure 12 includes the cargo box 14, a pair of side fenders 16*a*, 16*b* and a vehicle frame 18. In this embodiment, the vehicle frame 18 is comprised of two longitudinal box-frame rails 20*a*, 20*b* and a series of cross members 22 therebetween. The cargo box 14 and/or the fenders 16*a*, 16*b* are attached directly to the vehicle frame 18 by a series of bolt members (not shown). Also, in this embodiment, the side fenders 16*a*, 16*b* are comprised of aluminum. However, it is contemplated that the side fenders 16*a*, 16*b* can instead be comprised of stamped steel or various other suitable materials and constructions.

Figure 2:
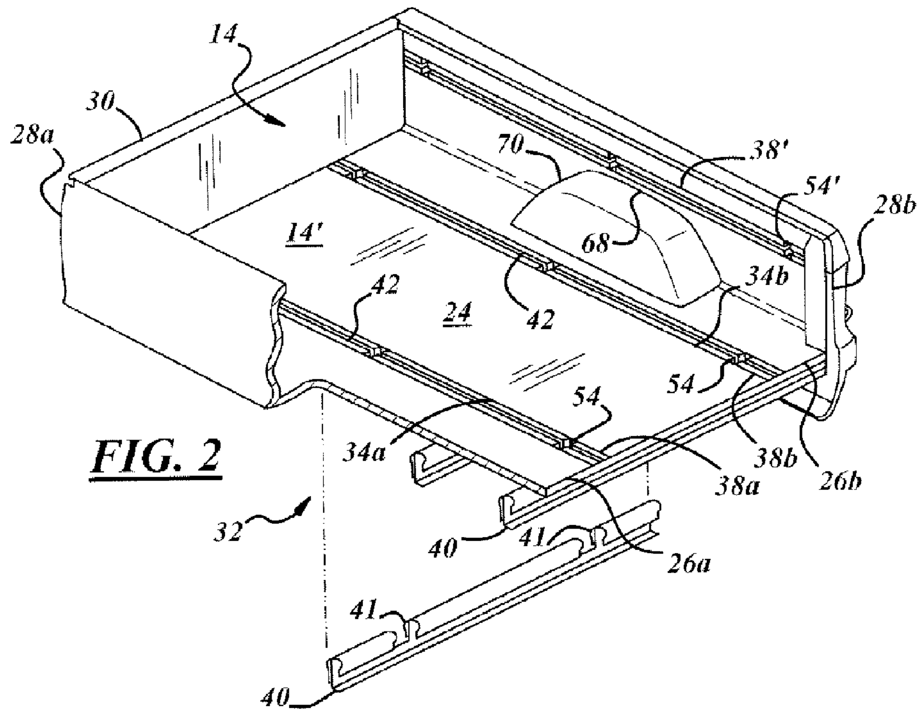
FIG. 2 is a partially cutaway perspective view of the cargo box inner shown in FIG. 1.

With attention now to FIG. 2, the cargo box 14 is comprised of a center floor panel 24, a pair of outboard floor panels 26*a*, 26*b*, a pair of sidewall panels 28*a*, 28*b*, a headboard panel 30, and an understructure framework 32, with one or more of these parts comprised of aluminum. In this embodiment, the central floor panel 24, the outboard floor panels 26*a*, 26*b*, and the sidewall panels 28*a*, 28*b* are aluminum tread plates. Also, the understructure framework 32 is a series of aluminum extrusions. It will be appreciated that the aluminum cargo box 14 provides a substantially strong and light construction. However, it is understood that one or more of these components can instead be comprised of other suitable strong and lightweight materials as desired.

The sidewall panels 28*a*, 28*b* surround a cargo bed 14' and extend from the outboard panels 26*a*, 26*b* by a predetermined angle. In this embodiment, the sidewall panels 28*a*, 28*b* extend substantially perpendicularly from the outboard floor panels 26*a*, 26*b* and thus increase the available storage space between the fenders 16*a*, 16*b* and within the cargo bed 14. It is understood that the sidewall panels 26*a*, 26*b* are adjacent to the side fenders 16*a*, 16*b*. In addition, to that end, the headboard panel 30 extend substantially perpendicularly from a front end portion of the center floor panel 24.

Figure 3:
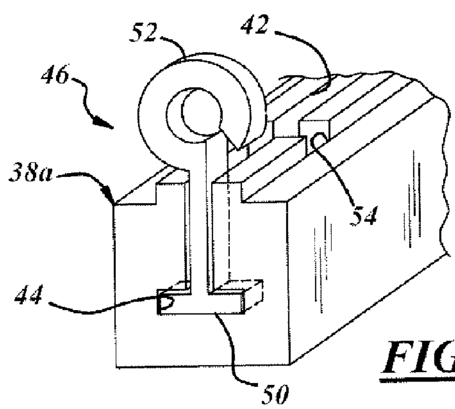
FIG. 3 is a perspective view of a longitudinal rail for the cargo box inner shown in FIG. 1.

The outboard panels 26*a*, 26*b* extend from a pair of opposing side portions 34*a*, 34*b* of the center floor panel 24. These side portions 34*a*, 34*b* are offset from a longitudinal axis 36 of the center floor panel 24. Also, the outboard floor panels 26*a*, 26*b* are substantially coplanar with the center floor panel 24. In this way, a wide cargo load can be distributed across the center floor panel 24 and the outboard floor panels 26*a*, 26*b*. The center floor panel 24 and the outboard floor panels 26*a*, 26*b* are attached to the understructure framework 32 and are supported by the same. The understructure framework 32 includes a pair of longitudinal rails 38*a*, 38*b* and a series of lateral rails 40. As best shown in FIG. 3, each longitudinal rail 38*a*, 38*b* defines an elongated slot 42 and an elongated channel 44 in open communication with the cargo bed 14' (shown in FIG. 1) for receiving a fastener 46 and securing a cargo item 48 (shown in FIG. 1) to the vehicle. In this respect, the longitudinal rails 38*a*, 38*b* provide a dual function of supporting the center floor panel 24 and outboard floor panels 26*a*, 26*b*, as well as securing cargo items 48 to the cargo box 14.

In this embodiment, as shown in FIG. 3, the fastener 46 is comprised of an anchor tab 50 and a hook member 52 extending from the anchor tab 50. In this way, the fastener 46 can receive twine, bungee cords, or a suitable female fastener for securing the cargo item 48 in the cargo bed 14. The anchor tab 50 is slidable within the channel 44 of the longitudinal rail 38*a*, 38*b* so as to secure a variety of different cargo items in various positions within the cargo box 14. The anchor tab 50 is sized larger than the slot 42 for retaining the fastener 46 within the channel 44. The longitudinal rails 38*a*, 38*b* define one or more notches 54 along the slot 42, which is sized for receiving the anchor tab 50 and inserting the same into the channel 44. Also, the anchor tab 50 and the respective rail 38*a*, 38*b* have a conventional locking mechanism, e.g. a spring-loaded detent tab, for securing the fastener 46 in a predetermined location in the cargo bed 14'.

Figure 4:
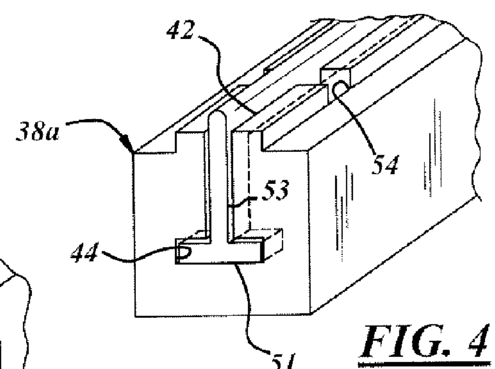
FIG. 4 is a perspective view of a longitudinal rail for the cargo box inner, according to an alternative embodiment of the claimed invention.

It is contemplated that the fastener 46 can have a variety of other suitable constructions. For instance, as shown in FIG. 4, the fastener 46 can omit the hook member 52 but rather have a divider panel 53 extending therefrom for cordoning one or more sections (not shown) of the cargo bed 14'. Namely, the divider panel 53 can be utilized for cordoning a forward driver-side portion of the cargo bed 14', which can store tools, a lunch bag, and various other items.

Figure 6A:
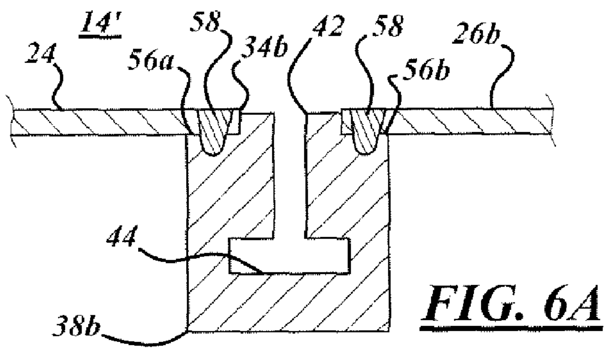
FIG. 6A is an enlarged view of the cargo box inner shown in FIG. 2 and encircled within circle 6A.
Figure 6B:
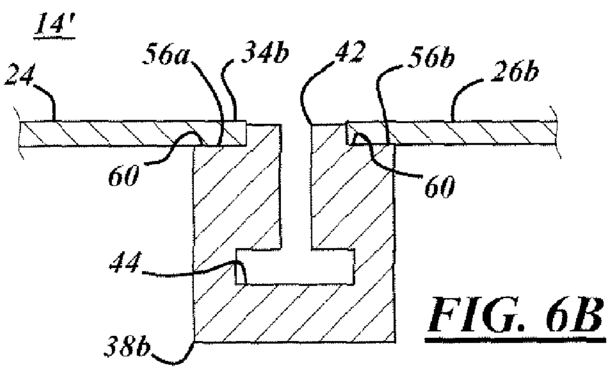
FIG. 6B is an enlarged view of a cargo box inner, according to an alternative embodiment of the claimed invention.

Referring now to FIGS. 6A and 6B, each longitudinal rail 38*a*, 38*b* has a pair of ledge seats 56*a*, 56*b* extending along its length and adjacent to the slot 42. The ledge seats 56*a*, 56*b* receive and support end portions of the central floor panel 24 and the respective outboard floor panels 26*a*, 26*b*. As exemplified in FIG. 7, it will be appreciated that each longitudinal rail 38*a*, 38*b* can instead have one ledge seat 56' as desired.

With attention to FIG. 6A, the central floor panel 24 and the outboard floor panel 26*b* are attached to the respective ledge seats 56*a*, 56*b* by a friction stir weld 58. However, as exemplified in the embodiment shown in FIG. 6B, the central floor panel 24 and the outboard floor panels 26*a*, 26*b* can instead be attached to the respective ledge seats 56*a*, 56*b* by an adhesive bond 60 or other suitable fastening means as desired.

Figure 5:
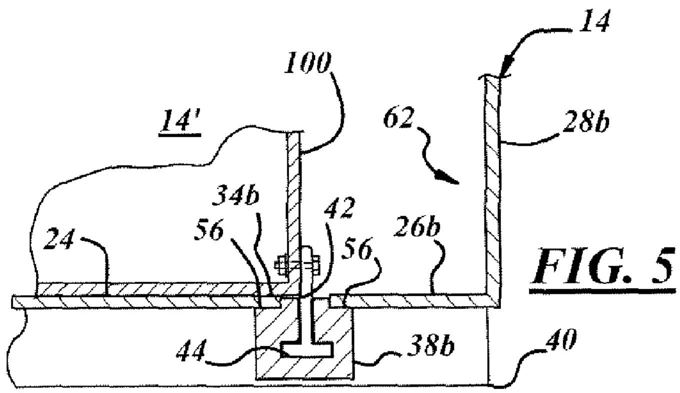
FIG. 5 is a cross-sectional view of the cargo box inner shown in FIG. 2, as taken along line 4-4.

Referring back to FIG. 5, the outboard floor panel 26*b* and the adjacent sidewall panel 28*b* are integral parts of a one-piece panel 62. In this respect, the one-piece panel 62 is an aluminum tread plate with a simple bend to form both the outboard floor panel 26*b* and the sidewall panel 28*b*. As best shown in FIG. 1, this plate has a cut-out opening 68 for receiving and attaching to a wheel house cover 70. In this embodiment, the wheel house cover 70 is comprised of aluminum. However, the wheel house cover 70 can instead be comprised of a polymer composite molding or other suitable material as desired.

Figure 7:
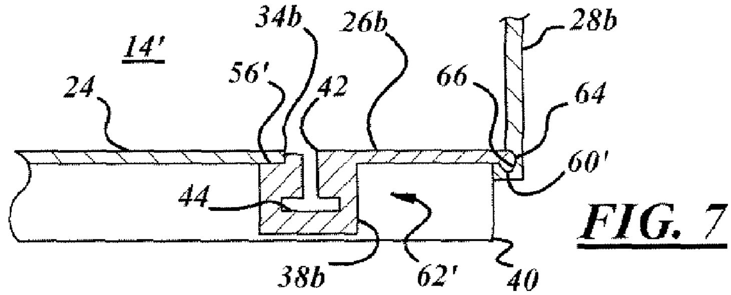
FIG. 7 is a cross-sectional view of a cargo box inner according to another alternative embodiment of the claimed invention.

With attention to the embodiment shown in FIG. 7, the longitudinal rail 38*b* and the adjacent outboard floor panel 26*b* are integral parts of a one-piece extruded panel 62'. The outboard floor panel 26*b* has a ridge 64 extending generally parallel to the longitudinal axis 36 (shown in FIG. 1) of the center floor panel 24. Also, the sidewall panel 28*b* has a groove 66 that receives the ridge 64 and an adhesive bond 60' or other suitable fastening means for interlocking the one-piece panel 62' with the adjacent sidewall panel 28*b*.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A cargo box inner for a vehicle, comprising:

a center floor panel with a longitudinal axis and a pair of opposing side portions offset from said longitudinal axis;

a pair of outboard floor panels extending from said pair of opposing side portions;

a pair of sidewall panels extending from said pair of outboard floor panels by a predetermined angle;

said pair of sidewall panels surrounding a cargo bed for said vehicle; and an understructure framework attached to said center floor panel and said pair of outboard floor panels;

said understructure framework comprised of a pair of longitudinal rails and a series of lateral rails;

said pair of longitudinal rails each defining an elongated slot and an elongated channel in open communication with said cargo bed for receiving a fastener and securing a cargo item to said cargo box inner;

at least one of said center floor panel, said pair of outboard floor panels, said understructure framework, and said pair of sidewall panels comprised of aluminum.

2. The cargo box inner recited in claim 1 wherein said pair of longitudinal rails and said series of lateral rails are interlocked by a plurality of apertures formed therein.

3. The cargo box inner recited in claim 2 wherein said pair of longitudinal rails extends perpendicularly between said series of lateral rails.

4. The cargo box inner recited in claim 1 wherein at least one of said center floor panel, said pair of outboard floor panels, and said pair of sidewall panels is an aluminum tread plate.

5. The cargo box inner recited in claim 1 wherein said elongated slot is sized narrower than said elongated channel for retaining said fastener within said elongated channel.

6. The cargo box inner recited in claim 5 wherein said pair of longitudinal rails defines at least one notch along each said respective elongated slot for receiving said fastener within said respective elongated channel.

7. The cargo box inner recited in claim 1 wherein said fastener comprises an anchor tab slidable within said elongated channel and a hook extending from said anchor tab.

8. The cargo box inner recited in claim 1 wherein said elongated channel and said elongated slot of each respective one of said pair of longitudinal rails have at least one divider panel extending therefrom and into said cargo bed for cordoning at least one section of said cargo bed.

9. The cargo box inner recited in claim 8 wherein said divider panel extends from an anchor tab that is slidable within said elongated channel of said respective longitudinal rail.

10. The cargo box inner recited in claim 1 wherein said understructure framework includes at least one supplemental slotted rail with an elongated slot and an elongated channel and integrated within one of said sidewalls panels.

11. The cargo box inner recited in claim 1 wherein said pair of longitudinal rails defines at least one ledge seat attached to at least one of said center floor panel and said outboard floor panels.

12. The cargo box inner recited in claim 11 wherein at least one of said outboard floor panels and said center floor panel is attached to said at least one ledge seat by a friction weld.

13. The cargo box inner recited in claim 11 wherein at least one of said outboard floor panels and said center floor panel is attached to said at least one ledge seat by an adhesive.

14. The cargo box inner recited in claim 1 wherein said pair of sidewall panels and said pair of outboard floor panels have a pair of wheel house cover panels therebetween.

15. The cargo box inner recited in claim 14 wherein said pair of wheel house covers are comprised of a material selected from the group consisting of aluminum and a polymer composite molding.

16. A rear-end vehicle body structure, comprising:

said cargo box inner recited in claim 1 with a headboard panel extending substantially perpendicularly from a front end portion of said center floor panel;

a pair of sidewall fenders adjacent to said pair of sidewall panels; and a vehicle frame attached to said cargo box inner.

* * * * *